(12) United States Patent
Chee et al.

(10) Patent No.: US 11,006,460 B2
(45) Date of Patent: May 11, 2021

(54) WIRELESS COMMUNICATION WITH DEDICATED DYNAMIC FREQUENCY SELECTION

(71) Applicant: MediaTek Singapore Pte. Ltd., Singapore (SG)

(72) Inventors: YuenHui Chee, Saratoga, CA (US); Bing Xu, Gilbert, AZ (US); Shu-Ping Shiu, Tainan County (TW); James Wang, Cupertino, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 23 days.

(21) Appl. No.: 16/231,688

(22) Filed: Dec. 24, 2018

(65) Prior Publication Data
US 2019/0223213 A1 Jul. 18, 2019

Related U.S. Application Data

(60) Provisional application No. 62/617,658, filed on Jan. 16, 2018, provisional application No. 62/591,282, filed on Nov. 28, 2017.

(51) Int. Cl.
| | | |
|---|---|---|
| *H04W 4/00* | (2018.01) | |
| *H04W 74/08* | (2009.01) | |
| *H04W 16/14* | (2009.01) | |
| *H04W 16/10* | (2009.01) | |
| *H04B 1/10* | (2006.01) | |
| *H04B 1/525* | (2015.01) | |
| *H04W 72/02* | (2009.01) | |
| *H04B 1/18* | (2006.01) | |
| *H04B 1/04* | (2006.01) | |

(52) U.S. Cl.
CPC ........ *H04W 74/085* (2013.01); *H04B 1/0458* (2013.01); *H04B 1/1018* (2013.01); *H04B 1/18* (2013.01); *H04B 1/525* (2013.01); *H04W 16/10* (2013.01); *H04W 16/14* (2013.01); *H04W 72/02* (2013.01)

(58) Field of Classification Search
None
See application file for complete search history.

(56) References Cited

U.S. PATENT DOCUMENTS

| | | |
|---|---|---|
| 8,724,476 B2 | 5/2014 | Matsuura |
| 9,877,330 B2 | 1/2018 | Shapira |

(Continued)

FOREIGN PATENT DOCUMENTS

| | | |
|---|---|---|
| CN | 102571169 A | 10/2014 |
| CN | 105264919 A | 1/2016 |

*Primary Examiner* — Elisabeth Benoit Magloire
(74) *Attorney, Agent, or Firm* — McClure, Qualey & Rodack, LLP

(57) ABSTRACT

A wireless communication device and method are provided. The wireless communication device has dynamic frequency selection (DFS) capability and includes at least one wireless communication transceiver, a dedicated DFS receiver, and a controller. The transceiver performs data transmission on an operating channel. The dedicated DFS receiver is integrated in a chip with the transceiver. The dedicated DFS receiver scans for radar signals in a plurality of DFS channels besides the operating channel of the transceiver. The controller is coupled to the transceiver and the dedicated DFS receiver.

23 Claims, 15 Drawing Sheets

(56) References Cited

U.S. PATENT DOCUMENTS

| | | | |
|---|---|---|---|
| 2005/0215266 A1* | 9/2005 | Tsien | H04W 16/14 |
| | | | 455/454 |
| 2007/0060065 A1* | 3/2007 | Kruys | G01S 7/021 |
| | | | 455/67.11 |
| 2009/0206948 A1 | 8/2009 | Kemmochi et al. | |
| 2010/0311342 A1* | 12/2010 | Arbel | H04H 60/43 |
| | | | 455/62 |
| 2011/0218005 A1* | 9/2011 | Jeon | H04W 72/08 |
| | | | 455/509 |
| 2017/0026988 A1 | 1/2017 | Guo et al. | |
| 2018/0003797 A1* | 1/2018 | Perez-Ramirez | H04W 28/085 |
| 2018/0095160 A1* | 4/2018 | Perez-Ramirez | G01S 7/021 |
| 2018/0199342 A1* | 7/2018 | Rai | H04W 72/0453 |

* cited by examiner

WIRELESS COMMUNICATION WITH DEDICATED DYNAMIC FREQUENCY SELECTION

CROSS REFERENCE TO RELATED APPLICATIONS

This Application claims priority of U.S. Provisional Patent Application No. 62/617,658, filed on Jan. 16, 2018, the entirety of which is incorporated by reference herein.

BACKGROUND OF THE INVENTION

Field of the Invention

The invention relates in general to a wireless communication technology, and in particular, it relates to integrating a dedicated DFS receiver with a wireless communication transceiver in a chip of a wireless communication device.

Description of the Related Art

Dynamic Frequency Selection (DFS) technology is a Federal Communication Commission (FCC)/European Telecommunications Standards Institute (ETSI) requirement whereby a secondary user must identify and take action to avoid other primary or mission critical users (e.g. weather radar or military radar) when operating in the DFS frequency range (5.25 GHz-5.35 GHz, 5.47 GHz-5.725 GHz). Under DFS rules, when the operating channel of a secondary user overlaps with a DFS frequency, the user must listen and check for the presence of any radar signals for a minimum amount of contiguous time (e.g. 60 s) before making any transmission. This process is known as Channel Availability Check (CAC). Once the CAC is complete and no radar signals are found, the user can then start operating on the radar-free channel. During operation, the user has to continue to monitor for the presence of any radar signals. If a radar signal is detected during operation, the user has to vacate the existing operating channel within a specified time (e.g. 10 s). If the user switches to another operating channel that overlaps with the DFS frequencies, the user has to perform another CAC on the new operating channel.

However, in the A-band of Wi-Fi communication, a significant number of Wi-Fi channels overlap with the DFS channels. Due to DFS regulations, when the Wi-Fi operation is operating in the Wi-Fi DFS channel (i.e. the Wi-Fi channels overlapping with the DFS channels), user experience and data throughput will be significantly affected when a radar signal is encountered in the operating Wi-Fi DFS channel.

BRIEF SUMMARY OF THE INVENTION

A wireless communication device and method are provided to overcome the problems mentioned above.

An embodiment of the invention provides a wireless communication device. The wireless communication device has dynamic frequency selection (DFS) capability and comprises at least one transceiver, a dedicated DFS receiver and a controller. The transceiver performs data transmission or reception on an operating channel. The dedicated DFS receiver is integrated in a chip with the transceiver. The DFS receiver scans for radar signals in a plurality of DFS channels. The controller is coupled to the transceiver and the dedicated DFS receiver.

In some embodiments, the DFS receiver has a dedicated RF port and the DFS receiver and the transceiver are coupled to different antennas.

In some embodiments, the DFS receiver has a dedicated RF port and the DFS receiver shares an antenna with one of the transceivers. The wireless communication device may further comprise a matching network. The matching network is coupled to the DFS receiver and the transceiver which uses the same antenna as the DFS receiver. In addition, the matching network is configured outside of the chip.

In some embodiments, the DFS receiver shares an RF port and an antenna with one of the transceivers. The wireless communication device may further comprise a matching network. The matching network is directly coupled to the DFS receiver and the transceiver which share an RF port and an antenna with the DFS receiver. In addition, the matching network is configured in the chip.

An embodiment of the invention provides a wireless communication method. The wireless communication method comprises a step wherein at least one transceiver of the wireless communication device performs data transmission or reception on an operating channel; and a dedicated DFS receiver of the wireless communication device scans for radar signals in a plurality of DFS channels. The dedicated DFS receiver is integrated in a chip with the transceiver.

Other aspects and features of the invention will become apparent to those with ordinary skill in the art upon review of the following descriptions of specific embodiments of wireless communication devices and methods.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
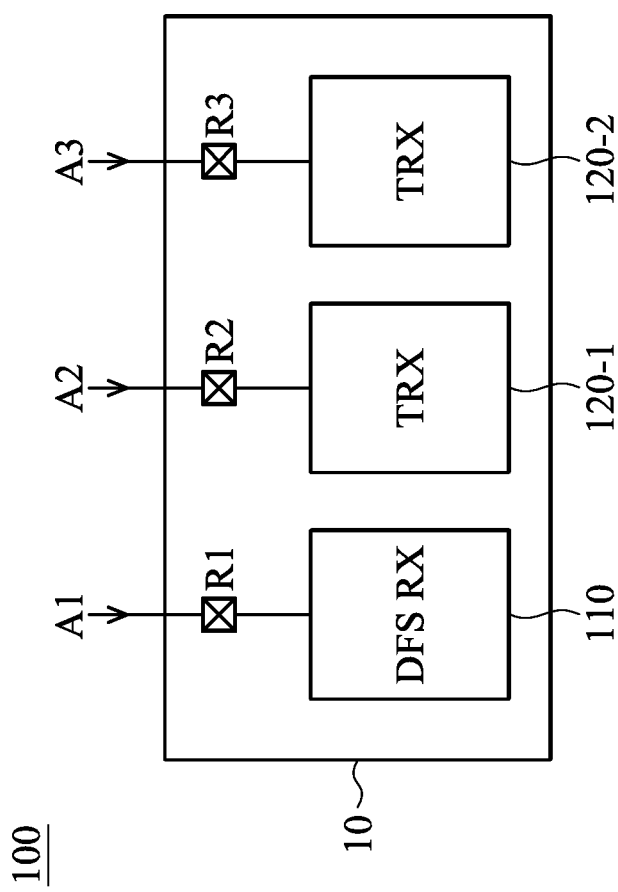
FIG. 1 is a block diagram of a wireless communication device 100 according to an embodiment of the invention.

FIG. 1 is a block diagram of a wireless communication device 100 according to an embodiment of the invention. The wireless communication device 100 has dynamic frequency selection (DFS) capability. As shown in FIG. 1, the wireless communication device 100 comprises a DFS receiver (RX) 110 and transceivers 120-1 and 120-2. Note that, FIG. 1 does not show every detailed element in order to clarify the concept of the invention. The invention should not be limited to what is shown in FIG. 1. In the embodiment of the invention, the wireless communication device 100 may comprise at least one transceiver, i.e. the number of transceivers should not be limited to what is shown in FIG. 1. Furthermore, in the embodiment of the invention, each transceiver may be a WLAN transceiver and each transceiver may comprise a receiver (indicated as a main receiver in the invention) and a transmitter (indicated as a main transmitter in the invention) to respectively receive and transmit WLAN signals. In the embodiment of the invention, the DFS receiver 110, the transceivers 120-1 and 120-2, and the RF ports R1, R2 and R3 are configured (or integrated) in a chip 10.

As shown in FIG. 1, in the embodiment of the invention, the DFS receiver 110 may have a dedicated RF port R1. The RF port R1 is dedicated for radar scanning purpose and is not used for transmitting/receiving wireless communication signals specified by the transceivers 120-1 and 120-2. The DFS receiver 110 is dedicated for radar scanning purpose and is not used for transmitting/receiving wireless communication signals specified by the transceivers 120-1 and 120-2. By having dedicated DFS RX, the throughput of the wireless communication device 100 can be maintained while CAC is required. The DFS receiver 110 may be coupled to the antenna A1 through the dedicated RF port R1. Furthermore, the transceiver 120-1 may have an RF port R2 and the transceiver 120-2 may have an RF port R3. The transceiver 120-1 may be coupled to the antenna A2 through the RF port R2, and the transceiver 120-2 may be coupled to the antenna A3 through the RF port R3. In the embodiment, the RF ports R2 and R3 may the TX RF port combined with the RX RF port.

Each of the transceivers 120-1 and 120-2 may perform data transmission on at least one operating channel. The DFS receiver 110 may scan for radar signals in a plurality of DFS channels besides the operating channels used by the main transmitters or receivers of the transceivers 120-1 and 120-2. In an embodiment, if the operating channels used by the main transmitters or receivers of the transceivers 120-1 and 120-2 are DFS channels, the DFS receiver 110 may scan for radar signals in other DFS channels to find the radar-free DFS channel in advance. Once the transceivers 120-1 and 120-2 need to change operation channel, the radar-free channel has been already specified, and the transceivers 120-1 and 120-2 can jump to the radar-free channel and perform signal transceiving without waiting for CAC period and sacrificing throughput.

Figure 2:
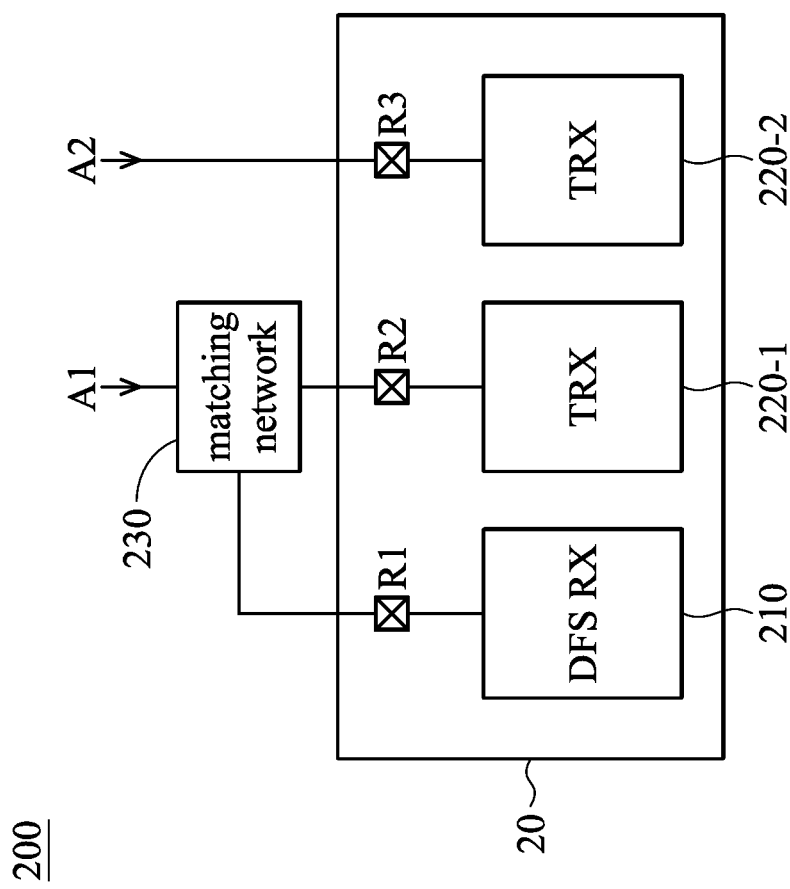
FIG. 2 is a block diagram of a wireless communication device 200 according to another embodiment of the invention.

FIG. 2 is a block diagram of a wireless communication device 200 according to another embodiment of the invention. The wireless communication device 200 has dynamic frequency selection (DFS) capability. As shown in FIG. 2, the wireless communication device 200 comprises a DFS receiver 210, transceiver 220-1 and 220-2, and a matching network 230. Note that, FIG. 2 does not show every detail element in order to clarify the concept of the invention. The invention should not be limited to what is shown in FIG. 2. In the embodiment of the invention, the wireless communication device 200 may comprise at least one transceiver, i.e. the number of transceivers should not be limited to what is shown in FIG. 2. Furthermore, in the embodiment of the invention, each transceiver may be a WLAN transceiver and each transceiver may comprise a receiver (RX) and a transmitter (TX) to receive and transmit data. In the embodiment of the invention, the DFS receiver 210, the transceivers 220-1 and 220-2, and RF ports R1, R2 and R3 are configured in a chip 20. In an embodiment of the invention, the matching network 230 may be a switch or a coupler. The RF port R1 is dedicated for radar scanning purpose and is not used for transmitting/receiving wireless communication signals specified by the transceivers 220-1 and 220-2. The DFS receiver 210 is dedicated for radar scanning purpose and is not used for transmitting/receiving wireless communication signals specified by the transceivers 220-1 and 220-2. By having dedicated DFS RX, the throughput of the wireless communication device 200 can be maintained while CAC is required.

Unlike FIG. 1, in the embodiment of the invention, there is matching network 230 configured outside of the chip 20. The DFS receiver 210 may share the same antenna with one transceiver (e.g. the transceiver 220-1 or the transceiver 220-2) through the matching network 230. Thus the production cost can be saved. For example, as shown in FIG. 2, the matching network 230 is respectively coupled to the DFS receiver 210 and the transceiver 220-1 through the RF port R1 and RF port R2. Furthermore, the matching network 230 is coupled to the antenna A1. Therefore, in the embodiment of the invention, the DFS receiver 210 and the transceiver 220-1 may share the same antenna (i.e. antenna A1) through the matching network 230. The structures of the DFS receiver 210, and the transceivers 220-1 and 220-2 are similar to the structures of the DFS receiver 110, and the transceivers 120-1 and 120-2, thereby, the details will not be illustrated repeatedly herein.

Figure 3:
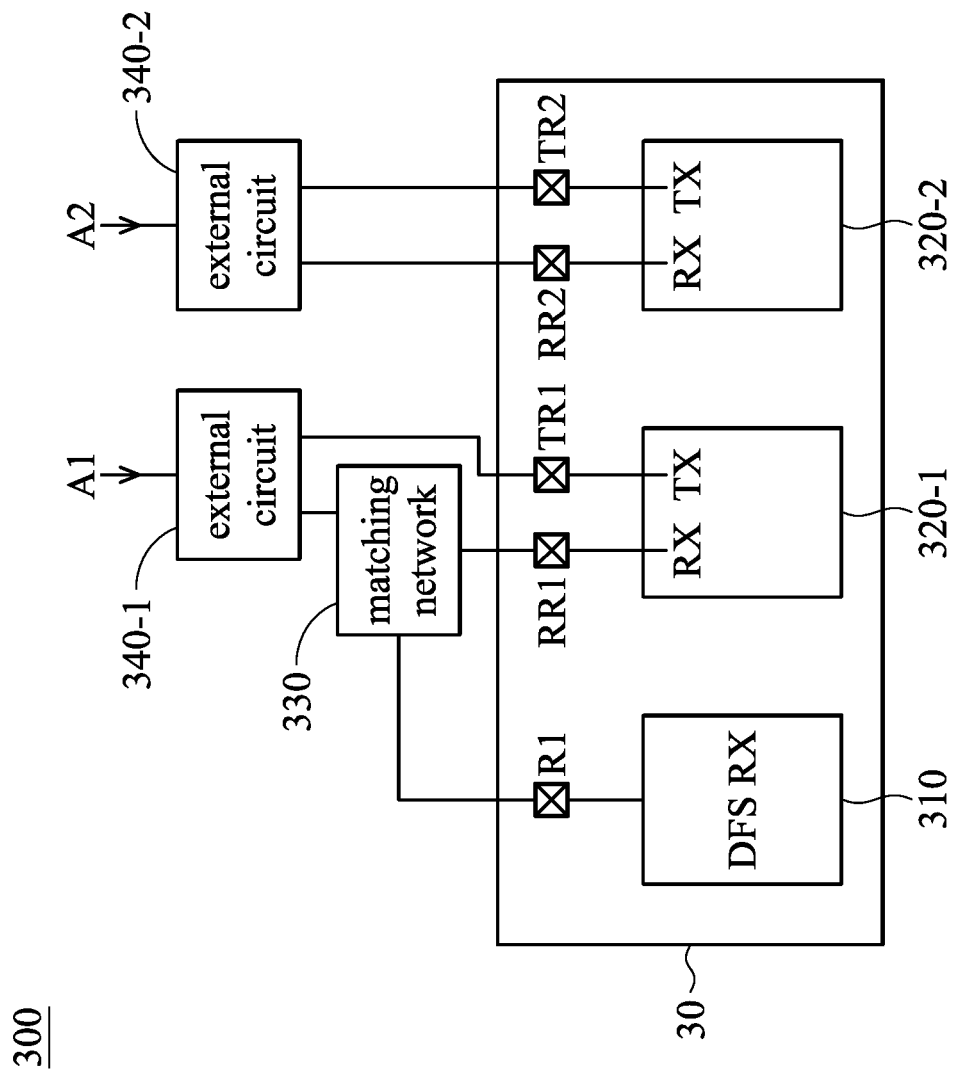
FIG. 3 is a block diagram of a wireless communication device 300 according to another embodiment of the invention.

FIG. 3 is a block diagram of a wireless communication device 300 according to another embodiment of the invention. The wireless communication device 300 has dynamic frequency selection (DFS) capability. As shown in FIG. 3, the wireless communication device 300 comprises a DFS receiver 310, transceiver 320-1 and 320-2, a matching network 330, and external circuits 340-1 and 340-2. Note that, FIG. 3 does not show every detail element in order to clarify the concept of the invention. The invention should not be limited to what is shown in FIG. 3. In the embodiment of the invention, the wireless communication device 300 may comprise at least one transceiver, i.e. the number of transceivers should not be limited to what is shown in FIG. 3. Furthermore, in the embodiment of the invention, each transceiver may be a WLAN transceiver and each transceiver may comprise a receiver and a transmitter to receive and transmit data. In the embodiment of the invention, the DFS receiver 310, the transceivers 320-1 and 320-2, and RF ports R1, TX RF ports TR1 and TR2, and RX RF ports RR1 and RR2 are configured in a chip 30. In an embodiment of the invention, the matching network 330 may be a switch or a coupler. The RF port R1 is dedicated for radar scanning purpose and is not used for transmitting/receiving wireless communication signals specified by the transceivers 320-1 and 320-2. The DFS receiver 310 is dedicated for radar scanning purpose and is not used for transmitting/receiving wireless communication signals specified by the transceivers 320-1 and 320-2. By having dedicated DFS RX, the throughput of the wireless communication device 300 can be maintained while CAC is required.

Unlike FIG. 2, in the embodiment of the invention, there are external circuits 340-1 and 340-2 configured outside of the chip 30. The external circuits 340-1 and 340-2 are respectively separated from the transceiver 320-1 and the transceiver 320-2. In an embodiment of the invention, the external circuit (e.g. external circuits 340-1 and 340-2) may comprise an external low noise amplifier (eLNA), external power amplifier (ePA), external transmission/reception switch (eTRSW) and/or a front-end module (FEM).

Furthermore, as shown in FIG. 3, in the embodiment of the invention, the transceiver 320-1 may have the TX RF port TR1 and RX RF port RR1 and the transceiver 320-2 may have the TX RF port TR2 and RX RF port RR2. The receiver of the transceiver 320-1 is coupled to the matching network 330 through RX RF port RR1, and the transmitter of the transceiver 320-1 is coupled to the external circuit 340-1 through the TX RF port TR1. Furthermore, the receiver of the transceiver 320-2 is coupled to the external circuit 340-2 through RX RF port RR2, and the transmitter of the transceiver 320-2 is coupled to the external circuit 340-2 through the TX RF port TR2. The external circuits 340-1 and 340-2 are respectively coupled to the antennas A1 and A2.

Figure 4:
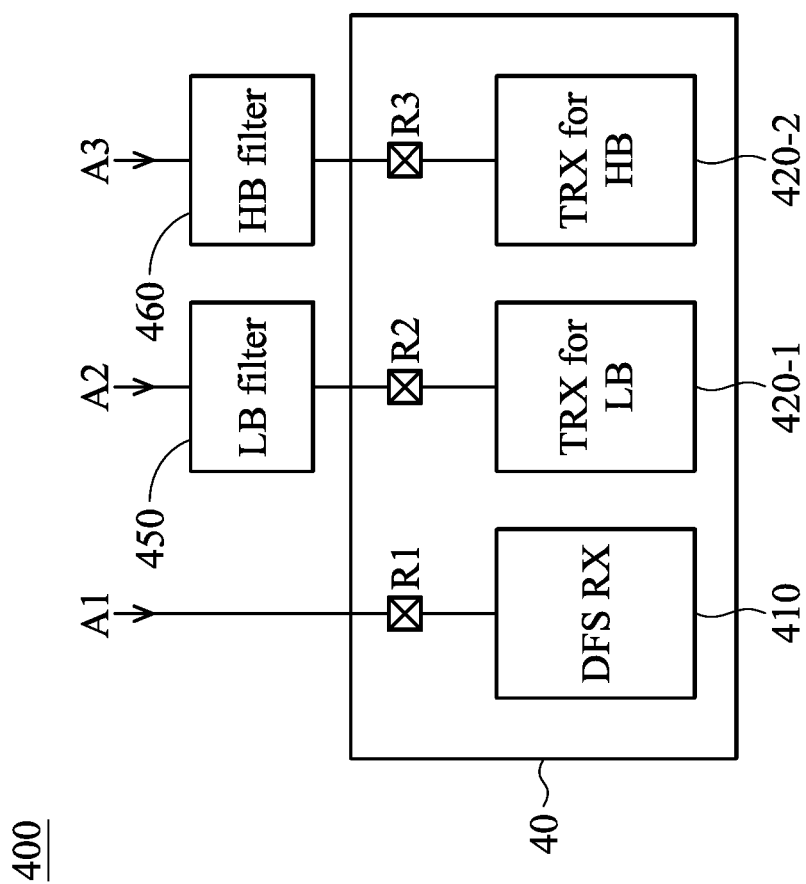
FIG. 4 is a block diagram of a wireless communication device 400 according to another embodiment of the invention.

FIG. 4 is a block diagram of a wireless communication device 400 according to another embodiment of the invention. The wireless communication device 400 has dynamic frequency selection (DFS) capability. As shown in FIG. 4, the wireless communication device 400 comprises a DFS receiver 410, transceivers 420-1 and 420-2, a low-band (LB) filter 450 and a high-band (HB) filter 460. Note that, FIG. 4 does not show every detail element in order to clarify the concept of the invention. The invention should not be limited to what is shown in FIG. 4. In the embodiment of the invention, the wireless communication device 400 may comprise at least one transceiver, i.e. the number of transceivers should not be limited to what is shown in FIG. 4. Furthermore, in the embodiment of the invention, each transceiver may be a WLAN transceiver and each transceiver may comprise a receiver and a transmitter to receive and transmit data. In the embodiment of the invention, the DFS receiver 410, the transceivers 420-1 and 420-2, and the RF ports R1, R2 and R3 are configured in a chip 40. The RF port R1 is dedicated for radar scanning purpose and is not used for transmitting/receiving wireless communication signals specified by the transceivers 420-1 and 420-2. The DFS receiver 410 is dedicated for radar scanning purpose and is not used for transmitting/receiving wireless communication signals specified by the transceivers 420-1 and 420-2. By having dedicated DFS RX, the throughput of the wireless communication device 400 can be maintained while CAC is required.

Unlike FIG. 1, in the embodiment of the invention, the transceivers 420-1 is configured for low-band and the transceivers 420-2 is configured for high-band. Therefore, the wireless communication device 400 may support two band isolations, and may be applied to the dual-band operation. In another embodiment of the invention, some external circuits corresponding to the transceivers 420-1 and 420-2 also can be configured outside of the chip 40 (such as the external circuits 340-1 and 340-2 shown in FIG. 3).

Figure 5:
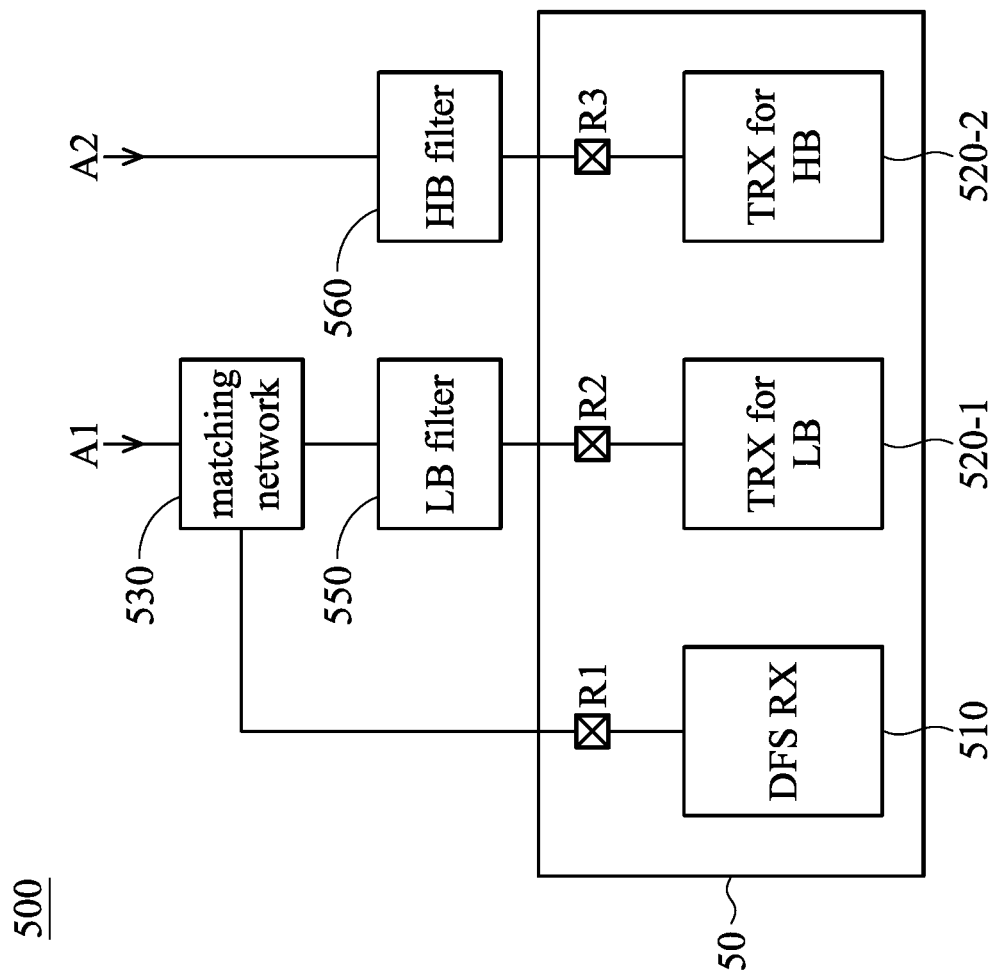
FIG. 5 is a block diagram of a wireless communication device 500 according to another embodiment of the invention.

FIG. 5 is a block diagram of a wireless communication device 500 according to another embodiment of the invention. The wireless communication device 500 has dynamic frequency selection (DFS) capability. As shown in FIG. 5, the wireless communication device 500 comprises a DFS receiver 510, transceivers 520-1 and 520-2, a matching network 530, a low-band (LB) filter 550 and a high-band (HB) filter 560. Note that, FIG. 5 does not show every detail element in order to clarify the concept of the invention. The invention should not be limited to what is shown in FIG. 5. In the embodiment of the invention, the wireless communication device 500 may comprise at least one transceiver, i.e. the number of transceivers should not be limited to what is shown in FIG. 5. Furthermore, in the embodiment of the invention, each transceiver may be a WLAN transceiver and each transceiver may comprise a receiver and a transmitter to receive and transmit data. In the embodiment of the invention, the DFS receiver 510, the transceivers 520-1 and 520-2, and the RF ports R1, R2 and R3 are configured in a chip 50. In an embodiment of the invention, the matching network 530 may be a switch or a coupler. The RF port R1 is dedicated for radar scanning purpose and is not used for transmitting/receiving wireless communication signals specified by the transceivers 520-1 and 520-2. The DFS receiver 510 is dedicated for radar scanning purpose and is not used for transmitting/receiving wireless communication signals specified by the transceivers 520-1 and 520-2. By having dedicated DFS RX, the throughput of the wireless communication device 500 can be maintained while CAC is required Unlike FIG. 4, in the embodiment of the invention, there is matching network 530 configured outside of the chip 50. The matching network 530 is coupled to the DFS receiver 510 through the RF port R1 and coupled to the low-band (LB) filter 550. Therefore, in the embodiment of the invention, the DFS receiver 510 and the transceiver 520-1 may share the same antenna (i.e. antenna A1) through the matching network 530. Thus the production cost can be saved. In another embodiment of the invention, the matching network 530 may be coupled to the DFS receiver 510 through the RF port R1 and coupled to the high-band (HB) filter 560 (i.e. the DFS receiver 510 and the transceiver 520-2 may share the same antenna (i.e. antenna A2) through the matching network 530). Furthermore, in another embodiment of the invention, external circuits corresponding to the transceivers 520-1 and 520-2 also can be configured outside of the chip 50 (such as the external circuits 340-1 and 340-2 shown in FIG. 3).

Figure 6:
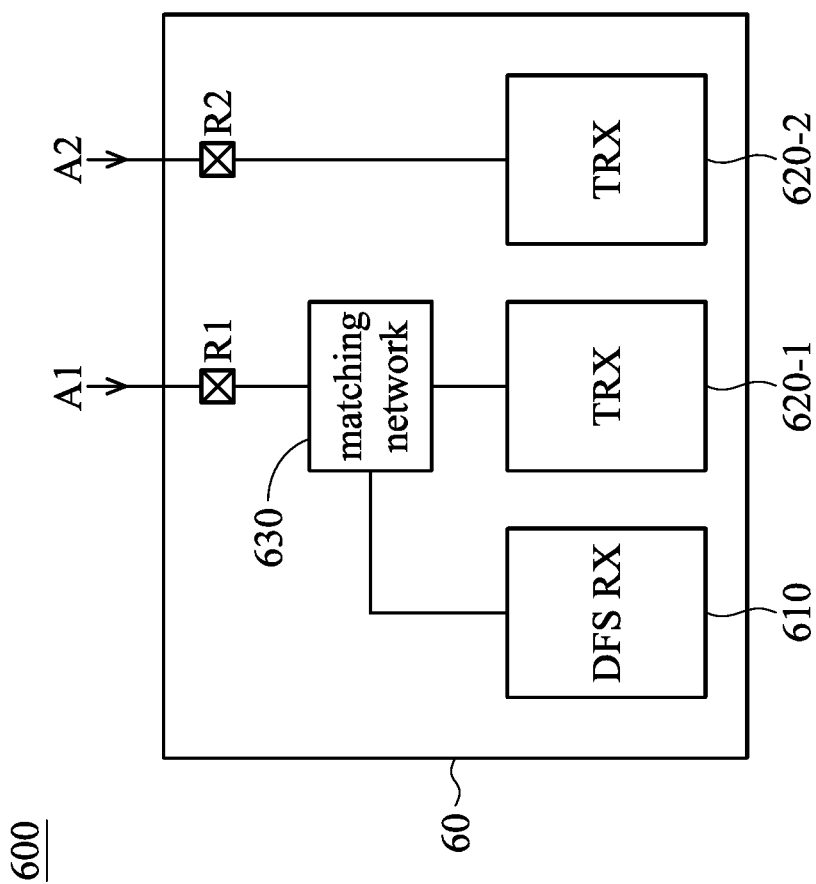
FIG. 6 is a block diagram of a wireless communication device 600 according to another embodiment of the invention.

FIG. 6 is a block diagram of a wireless communication device 600 according to another embodiment of the invention. The wireless communication device 600 has dynamic frequency selection (DFS) capability. As shown in FIG. 6, the wireless communication device 600 comprises a DFS receiver 610, transceivers 620-1 and 620-2 and a matching network 630. Note that, FIG. 6 does not show every element in detail in order to clarify the concept of the invention. The invention should not be limited to what is shown in FIG. 6. In the embodiment of the invention, the wireless communication device 600 may comprise at least one transceiver, i.e. the number of transceivers should not be limited to what is shown in FIG. 6. Furthermore, in the embodiment of the invention, each transceiver may be a WLAN transceiver and each transceiver may comprise a receiver and a transmitter to receive and transmit data. In the embodiment of the invention, the DFS receiver 610, the transceivers 620-1 and 620-2, the matching network 630, and the RF ports R1 and R2 are configured in a chip 60. In an embodiment of the invention, the matching network 630 may be a switch or a coupler.

Unlike FIG. 2, in the embodiment of the invention, the matching network 630 is configured in the chip 60. Therefore, the DFS receiver 610 and the transceiver 620-1 may be directly coupled to the matching network 630. Namely, in this embodiment of the invention, the DFS receiver 610 does not use a dedicated RF port. Furthermore, in the embodiment of the invention, the matching network 630 is coupled to the antenna A1 through the RF port R1. Therefore, the DFS receiver 610 and the transceiver 620-1 may share the same RF port (i.e. RF port R1) and the same antenna (i.e. antenna A1) through the matching network 630. The production cost can then be saved.

Figure 7:
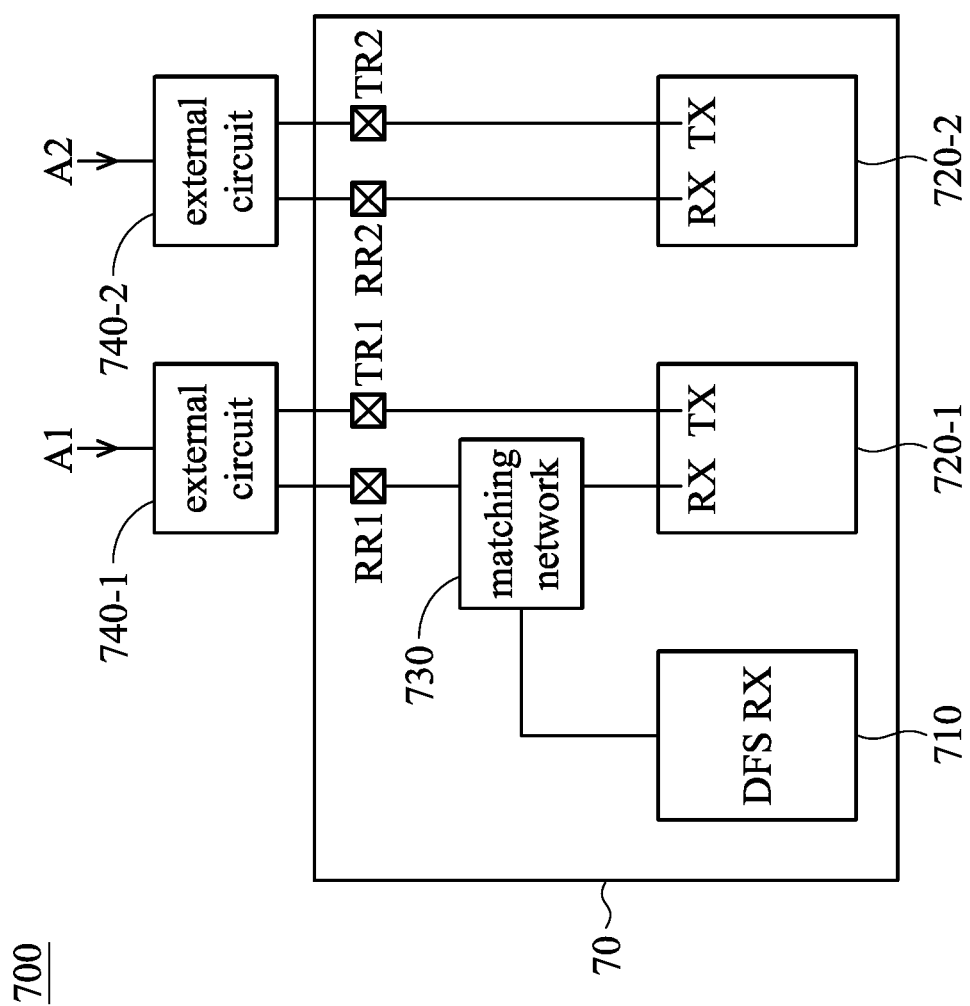
FIG. 7 is a block diagram of a wireless communication device 700 according to another embodiment of the invention.

FIG. 7 is a block diagram of a wireless communication device 700 according to another embodiment of the invention. The wireless communication device 700 has dynamic frequency selection (DFS) capability. As shown in FIG. 7, the wireless communication device 700 comprises a DFS receiver 710, transceiver 720-1 and 720-2, a matching network 730, and external circuits 740-1 and 740-2. Note that, FIG. 7 does not show every element in detail in order to clarify the concept of the invention. The invention should not be limited to what is shown in FIG. 7. In the embodiment of the invention, the wireless communication device 700 may comprise at least one transceiver, i.e. the number of transceivers should not be limited to what is shown in FIG. 7. Furthermore, in the embodiment of the invention, each transceiver may be a WLAN transceiver and each transceiver may comprise a receiver and a transmitter to receive and transmit data. In the embodiment of the invention, the DFS receiver 710, the transceivers 720-1 and 720-2, the matching network 730, and TX RF ports TR1 and TR2, and RX RF ports RR1 and RR2 are configured in a chip 70. In an embodiment of the invention, the matching network 730 may be a switch or a coupler.

Unlike FIG. 3, in the embodiment of the invention, the matching network 730 is configured in the chip 70. Therefore, the DFS receiver 710 and the transceiver 720-1 may be directly coupled to the matching network 730. Namely, in this embodiment of the invention, the DFS receiver 610 does not use a dedicated RF port. In the embodiment of the invention, the DFS receiver 710 and the main receiver of the transceiver 720-1 may share the same RF port (i.e. RX RF port RR1) and the same antenna (i.e. antenna A1) through the matching network 730.

Figure 8:
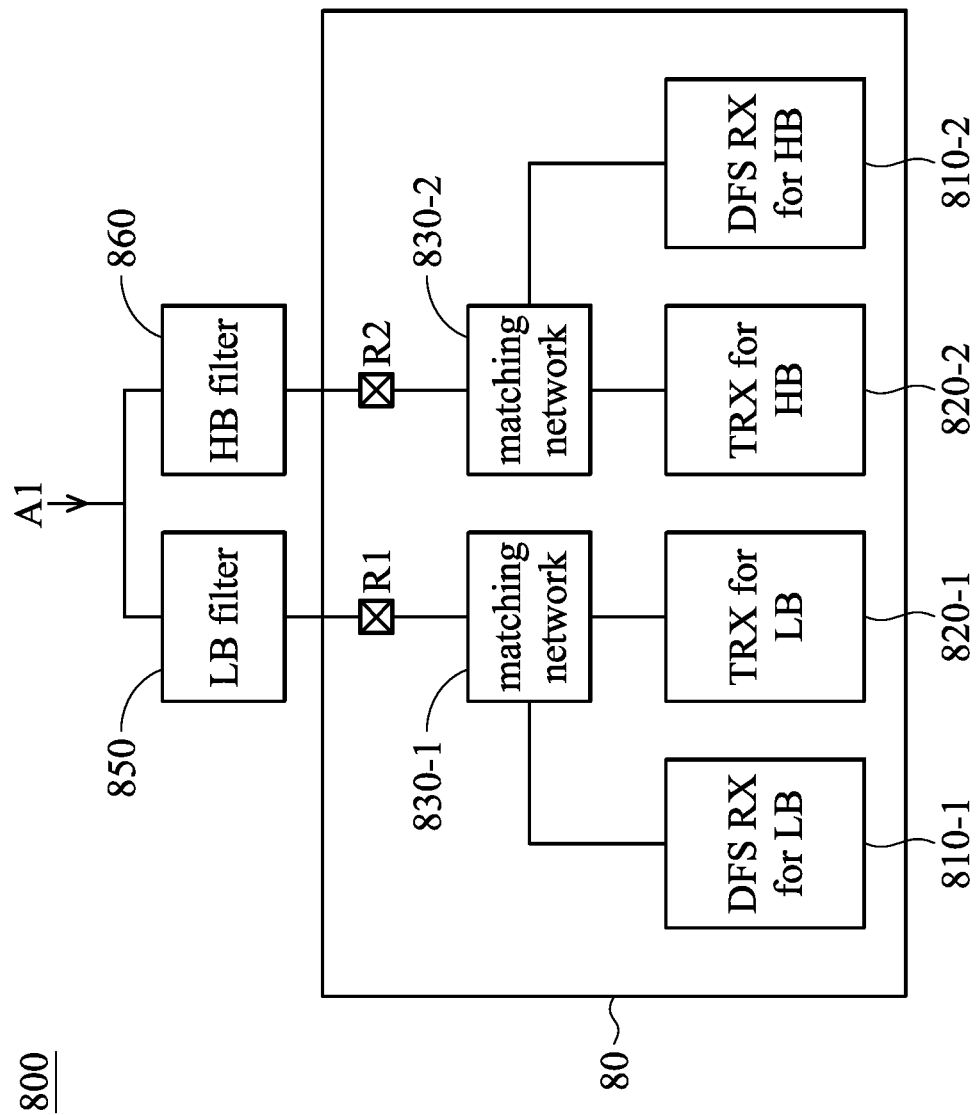
FIG. 8 is a block diagram of a wireless communication device 800 according to another embodiment of the invention.

FIG. 8 is a block diagram of a wireless communication device 800 according to another embodiment of the invention. The wireless communication device 800 has dynamic frequency selection (DFS) capability. As shown in FIG. 8, the wireless communication device 800 comprises a DFS receivers 810-1 and 810-2, transceivers 820-1 and 820-2, matching networks 830-1 and 830-2, a low-band (LB) filter 850, and a high-band (HB) filter 860. Note that, FIG. 8 does not show every element in detail in order to clarify the concept of the invention. The invention should not be limited to what is shown in FIG. 8. In the embodiment of the invention, the wireless communication device 800 may comprise at least one transceiver, i.e. the number of transceivers should not be limited to what is shown in FIG. 8. Furthermore, in the embodiment of the invention, each transceiver may be a WLAN transceiver and each transceiver may comprise a receiver (indicated as a main receiver in the invention) and a transmitter to receive and transmit data. In the embodiment of the invention, the DFS receivers 810-1 and 810-2, the transceivers 820-1 and 820-2, the matching networks 830-1 and 830-2, and the RF ports R1 and R2 are configured in a chip 80.

Unlike FIGS. 4 and 5, the low-band filter 850 and the high-band filter 860 are coupled to the same antenna. Therefore, in the embodiment of the invention, there is more than one DFS receiver (e.g. DFS receivers 810-1 and 810-2) and more than one matching network (e.g. matching networks 830-1 and 830-2) configured in the chip 80, and the transceivers 820-1 for low-band and the transceivers 820-2 for high-band may share the same antenna (i.e. antenna A1). Furthermore, in the embodiment of the invention, the matching networks 830-1 and 830-2 are configured in the chip 80. The matching networks 830-1 is coupled to the low-band filter 850 through RF port R1, and the matching networks 830-2 is coupled to the high-band filter 860 through RF port R2. Therefore, the DFS receiver 810-1 and the transceivers 820-1 may share the same RF port (i.e. RF port R1) and the same antenna (i.e. antenna A1), and the DFS receiver 810-2 and the transceivers 820-2 may share the same RF port (i.e. RF port R2) and the same antenna (i.e. antenna A1). In another embodiment of the invention, the low-band filter 850 and the high-band filter 860 may be coupled to different antennas, i.e. only one DFS receiver and one matching network need to be configured in the chip 80.

Figure 9:
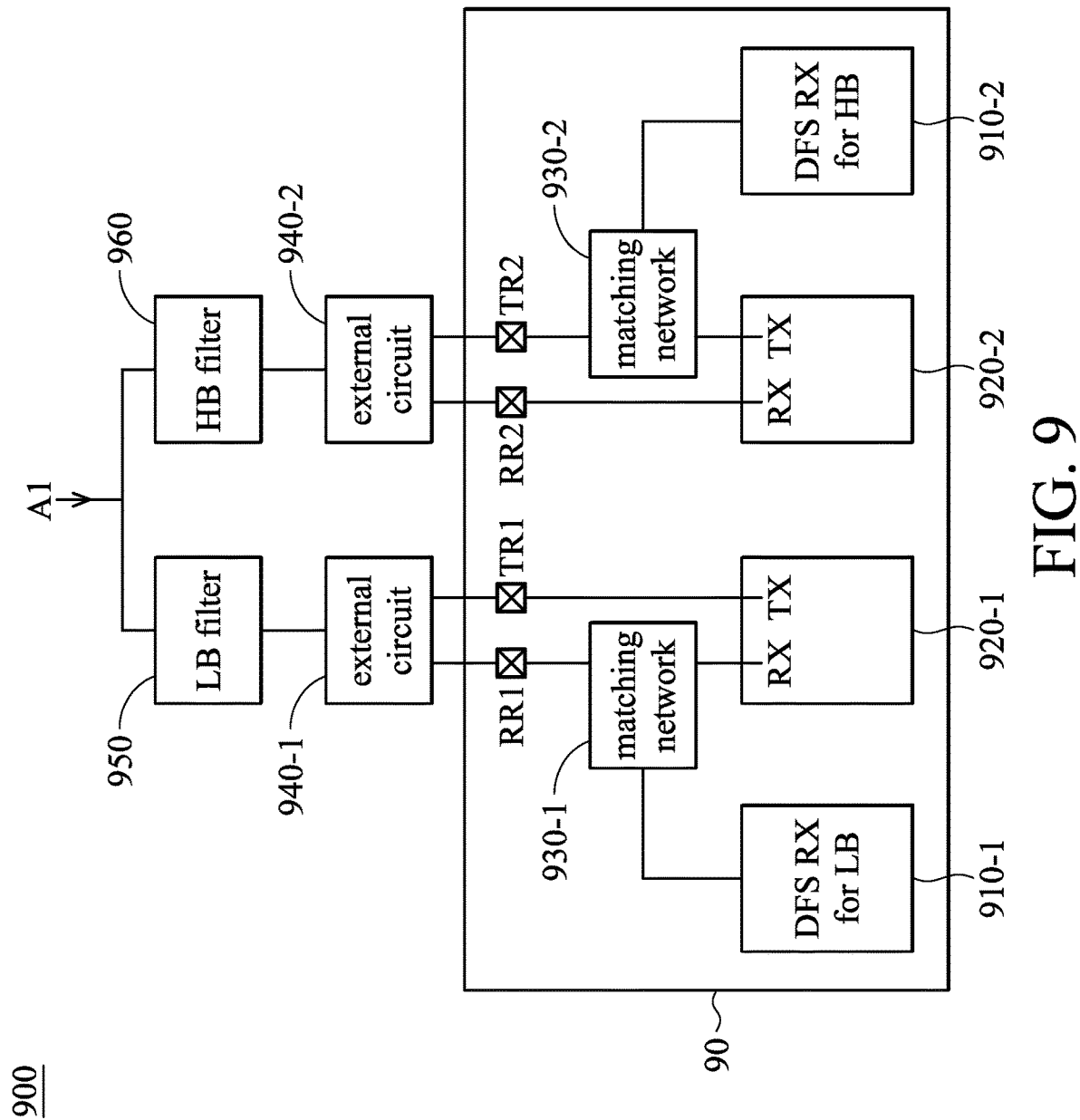
FIG. 9 is a block diagram of a wireless communication device 900 according to another embodiment of the invention.

FIG. 9 is a block diagram of a wireless communication device 900 according to another embodiment of the invention. The wireless communication device 900 has dynamic frequency selection (DFS) capability. As shown in FIG. 9, the wireless communication device 900 comprises a DFS receivers 910-1 and 910-2, transceivers 920-1 and 920-2, matching networks 930-1 and 930-2, external circuits 940-1 and 940-2, a low-band (LB) filter 950, and a high-band (HB) filter 960. Note that, FIG. 9 does not show every element in detail in order to clarify the concept of the invention. The invention should not be limited to what is shown in FIG. 9. In the embodiment of the invention, the wireless communication device 900 may comprise at least one transceiver, i.e. the number of transceivers should not be limited to what is shown in FIG. 9. Furthermore, in the embodiment of the invention, each transceiver may be a WLAN transceiver and each transceiver may comprise a receiver and a transmitter to receive and transmit data. In the embodiment of the invention, the DFS receivers 910-1 and 910-2, the transceivers 920-1 and 920-2, the matching networks 930-1 and 930-2, the TX RF ports TR1 and TR2, and RX RF ports RR1 and RR2 are configured in a chip 90.

Unlike FIG. 8, in the embodiment of the invention, there are external circuits 940-1 and 940-2 configured outside of the chip 90. The external circuits 940-1 and 940-2 are respectively separated from the transceiver 920-1 and the transceiver 920-2. The external circuits 940-1 is coupled to the low-band filter 950, coupled to the matching network 930-1 through RX RF port RR1 and coupled to the transmitter of the transceiver 920-1 through TX RF port TR1. The external circuits 940-2 is coupled to the high-band filter 960, coupled to the matching network 930-2 through RX RF port RR2 and coupled to the transmitter of the transceiver 920-2 through TX RF port TR2. In the embodiment of the invention, the DFS receiver 910-1 and the main receiver of the transceiver 920-1 for low-band may share the same RF port (i.e. RX RF port RR1) and the same antenna (i.e. antenna A1) through the matching network 930-1, and the DFS receiver 910-2 and the main receiver of the transceiver 920-2 for high-band may share the same RF port (i.e. RX RF port RR2) and the same antenna (i.e. antenna A1) through the matching network 930-2. In another embodiment of the invention, the low-band filter 950 and the high-band filter 960 may be coupled to different antennas, i.e. only one DFS receiver and one matching network need to be configured in the chip 90.

Figure 10:
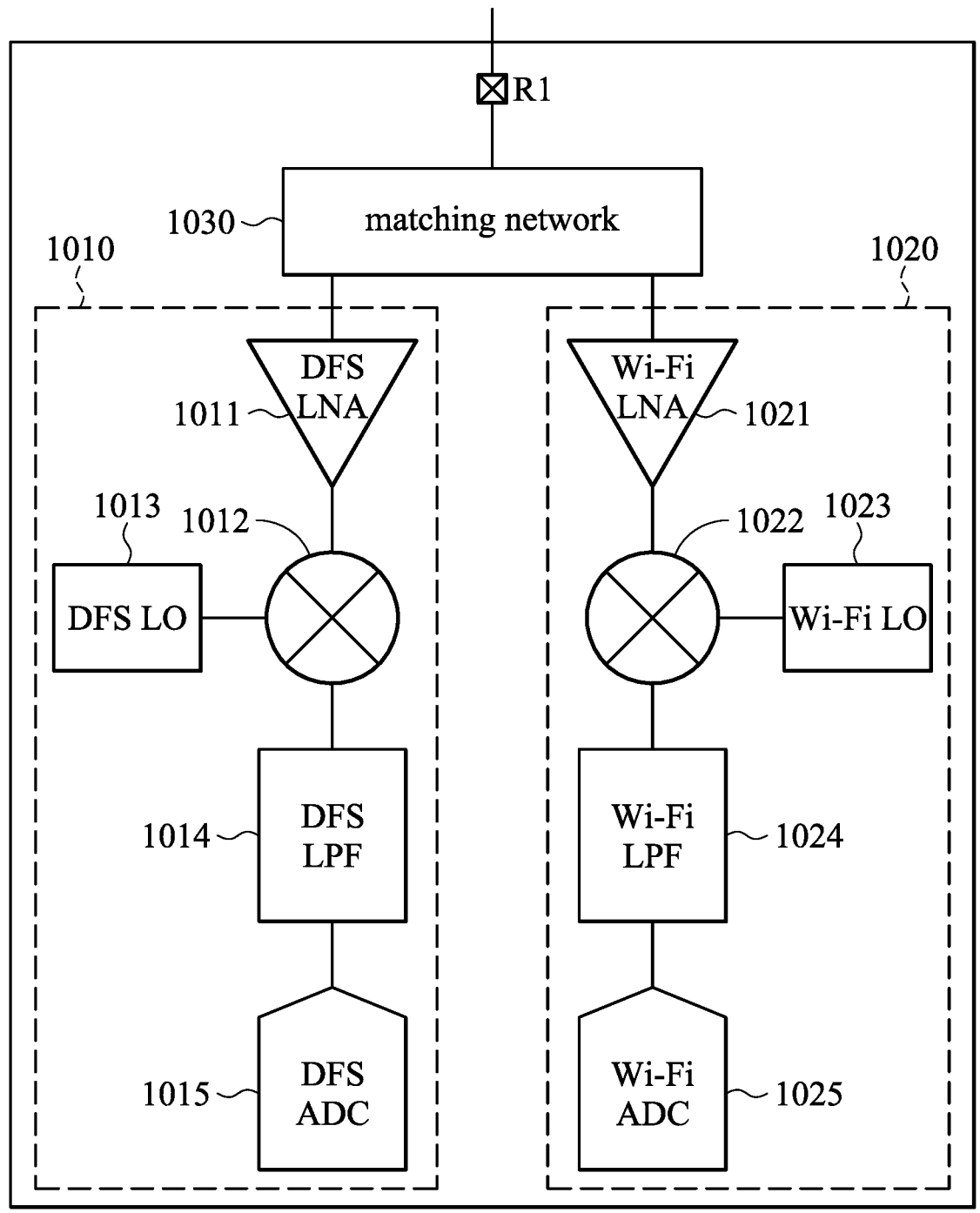
FIG. 10 is a schematic diagram of connection between a DFS receiver and a main receiver according to an embodiment of the invention.

FIG. 10 is a schematic diagram of connection between a DFS receiver and a main receiver according to an embodiment of the invention. As shown in FIG. 10, the DFS receiver 1010 may comprise a DFS LNA 1011, DFS mixer 1012, a DFS local oscillator (LO) 1013, a DFS low pass filter (LPF) 1014, and a DFS analog-digital convertor (ADC) 1015. The main receiver 1020 may comprises a Wi-Fi LNA 1021, Wi-Fi mixer 1022, a Wi-Fi LO 1023, a Wi-Fi LPF 1024, and a Wi-Fi ADC 1025. The DFS LNA 1011 and Wi-Fi LNA 1021 may be directly coupled to a matching network 1030. Furthermore, the matching network 1030 may be coupled to an RF port R1. Therefore, in the embodiment of the invention, the DFS receiver 1010 and the main receiver 1020 may share the same RF port. In the embodiment of the invention, the DFS receiver 1010, the main receiver 1020, the matching network 1030 and the RF port are configured in a chip. Furthermore, in the embodiment of the invention, the main receiver 1020 may share the same RF port with its corresponding transmitter in a transceiver. The structure of FIG. 10 may be applied to wireless communication device 600 of FIG. 6.

Figure 11:
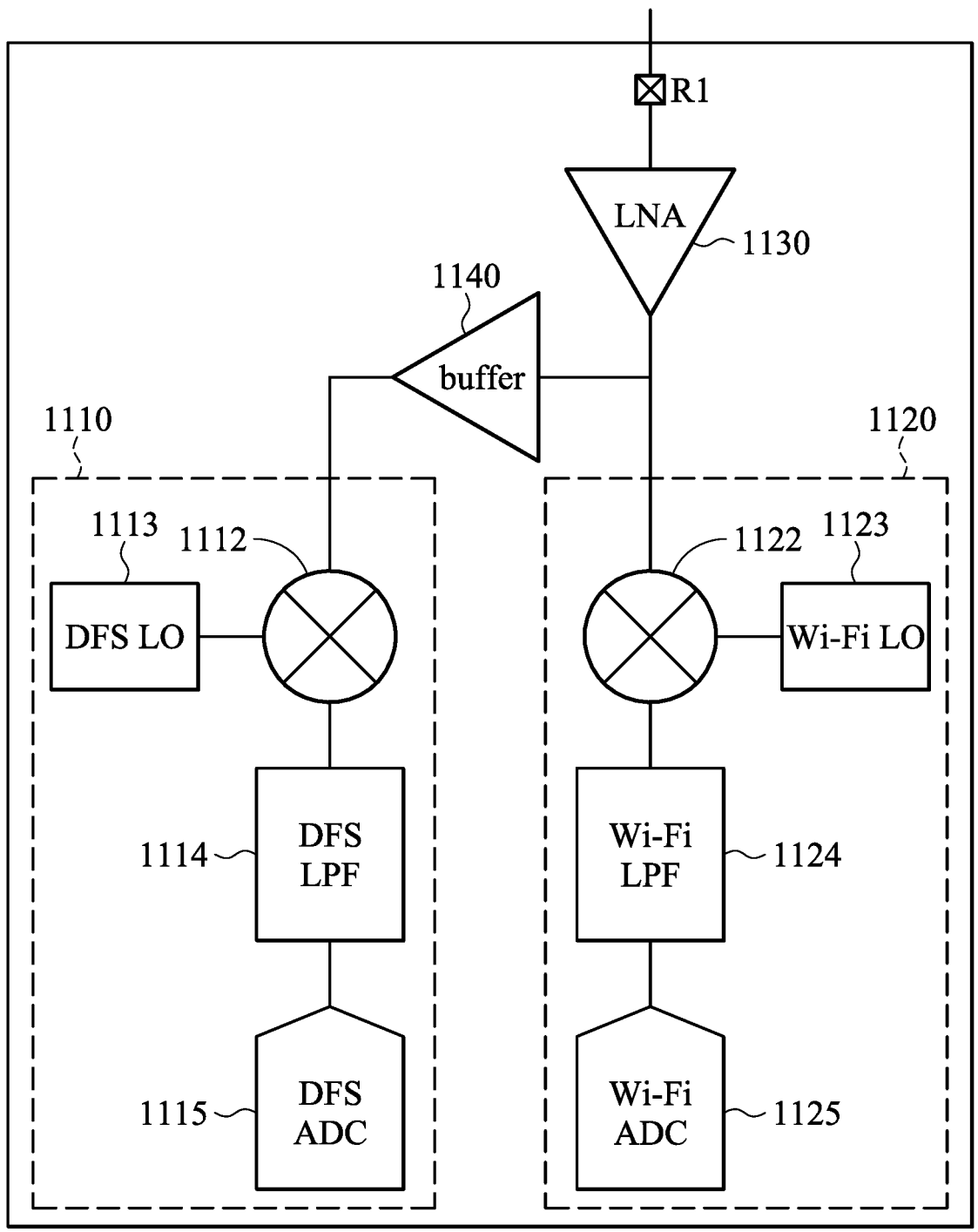
FIG. 11 is a schematic diagram of connection between a DFS receiver and a main receiver according to another embodiment of the invention.

FIG. 11 is a schematic diagram of connection between a DFS receiver and a main receiver according to another embodiment of the invention. As shown in FIG. 11, the DFS receiver 1110 may comprise DFS mixer 1112, a DFS LO 1113, a DFS LPF 1114, and a DFS ADC 1115. The main receiver 1120 may comprises a Wi-Fi mixer 1122, a Wi-Fi LO 1123, a Wi-Fi LPF 1124, and a Wi-Fi ADC 1125. The LNA 1130 is coupled to the Wi-Fi mixer 1122, and coupled to the DFS mixer 1112 through a buffer 1140. Furthermore, the LNA 1130 is coupled to the RF port R1. That is to say, in the embodiment of the invention, the DFS receiver 1110 and the main receiver 1120 share the same LNA and share the same RF port. In the embodiment of the invention, the DFS receiver 1110, the main receiver 1120, the LNA 1130, the buffer 1140 and the RF port are configured in a chip. Furthermore, in the embodiment of the invention, the main receiver 1120 may share the same RF port with its corresponding transmitter in a transceiver.

Figure 12:
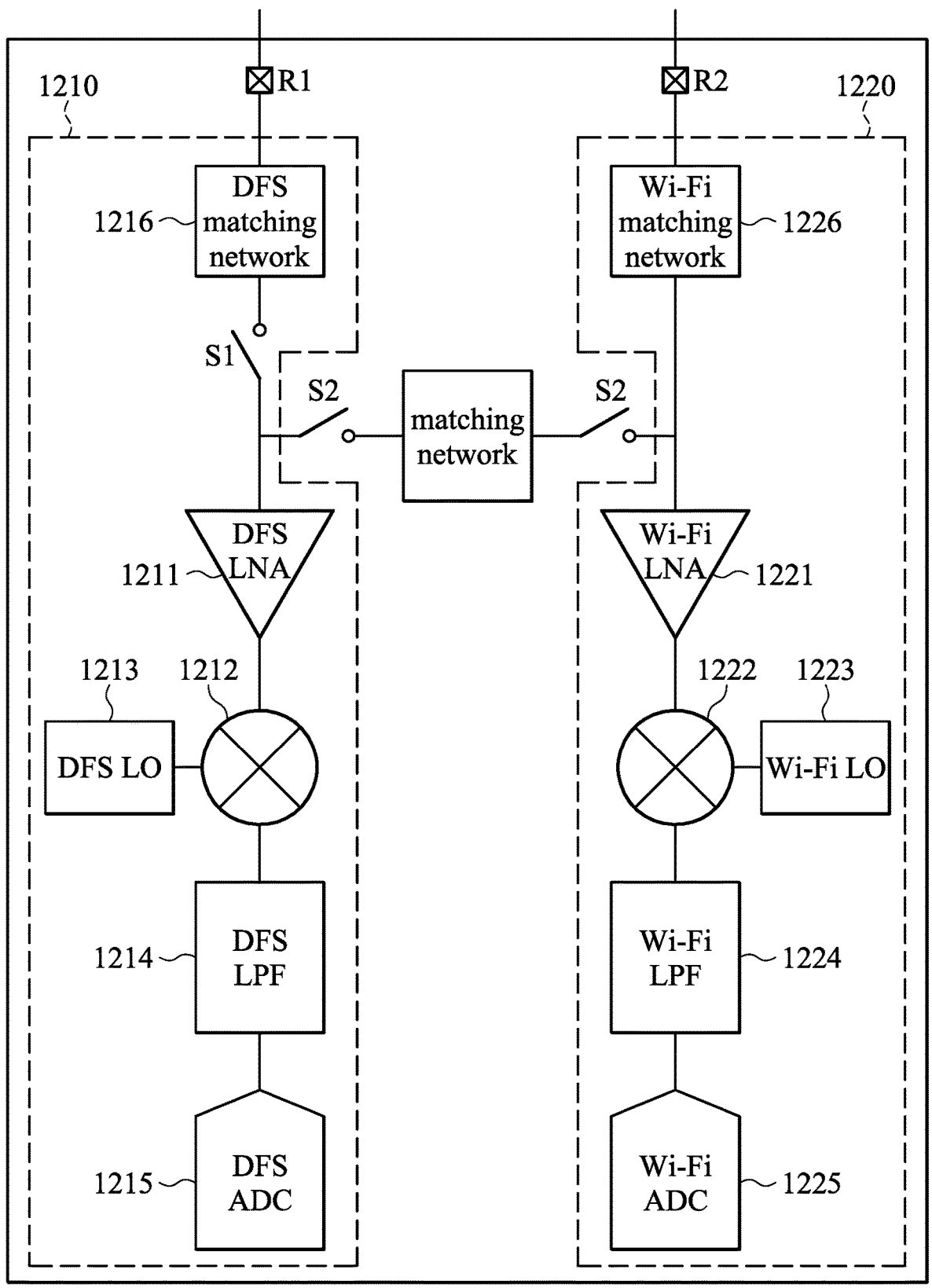
FIG. 12 is a schematic diagram of connection between a DFS receiver and a main receiver according to another embodiment of the invention.

FIG. 12 is a schematic diagram of connection between a DFS receiver and a main receiver according to another embodiment of the invention. As shown in FIG. 12, the DFS receiver 1210 may comprise a DFS LNA 1211, DFS mixer 1212, a DFS LO 1213, a DFS LPF 1214, a DFS ADC 1215, and a DFS matching network 1216. The main receiver 1220 may comprises a Wi-Fi LNA 1221, Wi-Fi mixer 1222, a Wi-Fi LO 1223, a Wi-Fi LPF 1224, a Wi-Fi ADC 1225, and a Wi-Fi matching network 1226. In the embodiment of the invention, a switch S1 may be configured between the DFS matching network 1216 and the DFS LNA 1211. Furthermore, a switch S2 may be configured between the matching network 1230 and the DFS LNA 1211 and configured between the matching network 1230 and the Wi-Fi LNA 1221. In the embodiment of the invention, the DFS receiver 1210 may use a dedicated RF port R1 or use the same RF port R2 as main receiver 1220 by switching the switch S1 and switch S2. When the switch S1 is closed and the switch is opened, the DFS receiver 1210 may use its dedicated RF port R1. When the switch S1 is opened and the switch is closed, the matching network 1230 is coupled to the DFS LNA 1211 and the Wi-Fi LNA 1221, and the DFS receiver 1210 and main receiver 1220 may share the same RF port R2 through the matching network 1230. Furthermore, in the embodiment of the invention, the main receiver 1220 may share the same RF port with its corresponding transmitter in a transceiver. The structure of FIG. 12 may be applied to switch to the structure of the wireless communication device 100 of FIG. 1 or to the structure of the wireless communication device 600 of FIG. 6.

In an embodiment of the invention, the wireless communication devices of the embodiments of the invention may comprise a controller (not shown in figures). The controller may control the DFS receiver and the transceivers. When the operation of a transceiver is initiated, the controller may select an initial operating channel and determine whether the selected operating channel is a non-DFS channel. If the selected operating channel is non-DFS channel, the transceiver may perform its operation on that non-DFS channel. If the selected operating channel is a DFS channel, the controller may control the DFS receiver to perform a channel availability check (CAC). If the CAC is passed, the controller controls the transceiver to perform its operation on the selected CAC-passed operating channel. If the CAC is not passed, the controller may select another operating channel and repeat the DFS steps described above. Furthermore, during the transceiver performs its operation on the selected operation channel, the controller controls the DFS receiver to scan for the radar signals in other DFS channels besides the selected operating channels used by the transceiver. When a radar signal is detected in the selected operating channel of the transceiver, the controller may immediately switch the transceiver to another available radar-free DFS channel which is determined through the DFS receiver in advance. If there are more than one radar-free (CAC-passed) channels determined by the DFS receiver, the controller may further consider some factors, such as channel quality, when determining the next operation channel. For example, if there are more than one radar-free (CAC-passed) channels determined by the DFS receiver, the controller may choose a channel having best channel quality or a channel having a channel quality above a threshold as the next operation channel.

The controller may control the DFS receiver and the transceivers by controlling the LO frequency of the LO in the DFS receiver and the transceivers (e.g., DFS LO 1013, 1113 and 1213, and Wi-Fi LO 1023, 1123 and 1223). When the wireless communication device transmits or receives communication signals (e.g., Wi-Fi signals) in a first operating channel, the controller tunes the LO frequency of the transceivers to a first frequency corresponding to the first operating channel. Then, the controller may determine the CAC is required. When CAC is required (for example, the wireless communication device performs CAC in advance during normal operation, or when interference occurs and the wireless communication device determines to switch from the first operating channel to a second operating channel which is a DFS channel), the controller tunes the DFS LO frequency of the DFS receiver to a second frequency corresponding to the second operating channel which is a DFS channel for radar signal detection; however, when the wireless communication device determines to switch from the first operating channel to a third operating channel which is not a DFS channel, the controller tunes the LO frequency of the transceivers to a third frequency corresponding to the third operating channel and do not tune the DFS LO frequency of the DFS receiver to the frequency corresponding to the third operating channel. The DFS LO frequency of the DFS receiver may be at the second operating channel which is a DFS channel while the transceivers are at the third operating channel.

In addition, in an embodiment of the invention, the controller may control whether to disable the DFS receiver. For example, when the data transmission is performed in the transceiver, the controller may disable the DFS receiver to avoid interference caused by the transmission signals. In an embodiment of the invention, the controller may be coupled to the LO of the DFS receiver and the LO of the main receiver to respectively adjust the LO frequency of the LO of the DFS receiver and the LO of the main receiver. The controller may be integrated with the processor or baseband module of the wireless communication device.

Figure 13:
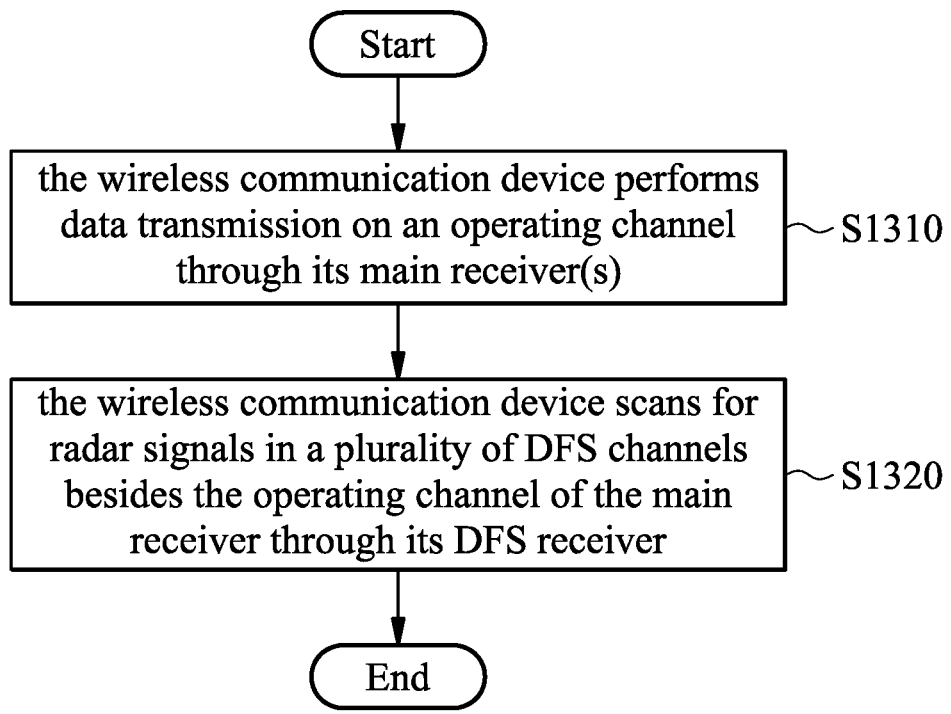
FIG. 13 is a flow chart illustrating the wireless communication method according to an embodiment of the invention.

FIG. 13 is a flow chart illustrating the wireless communication method according to an embodiment of the invention. The wireless communication method can be applied to the wireless communication devices of the invention. In step S1310, the wireless communication device may perform data transmission on an operating channel through its main receiver(s). In step S1320, the wireless communication device may scan for radar signals in a plurality of DFS channels besides the operating channel of the main receiver through its DFS receiver, wherein the DFS receiver is integrated with the main receiver in a chip.

In an embodiment of the invention, in the wireless communication method, the DFS receiver has a dedicated RF port and the DFS receiver and the main receiver are coupled to different antennas.

In an embodiment of the invention, in the wireless communication method, the DFS receiver has a dedicated RF port and the DFS receiver uses the same antenna as one of the main receivers.

In an embodiment of the invention, in the wireless communication method, the DFS receiver shares an RF port and an antenna with one of the main receivers.

In an embodiment of the invention, in the wireless communication method, a controller of the wireless communication device may control whether to disable the DFS receiver. For example, when the data transmission is performed in the main transmitter, the controller may disable the DFS receiver.

Figure 14:
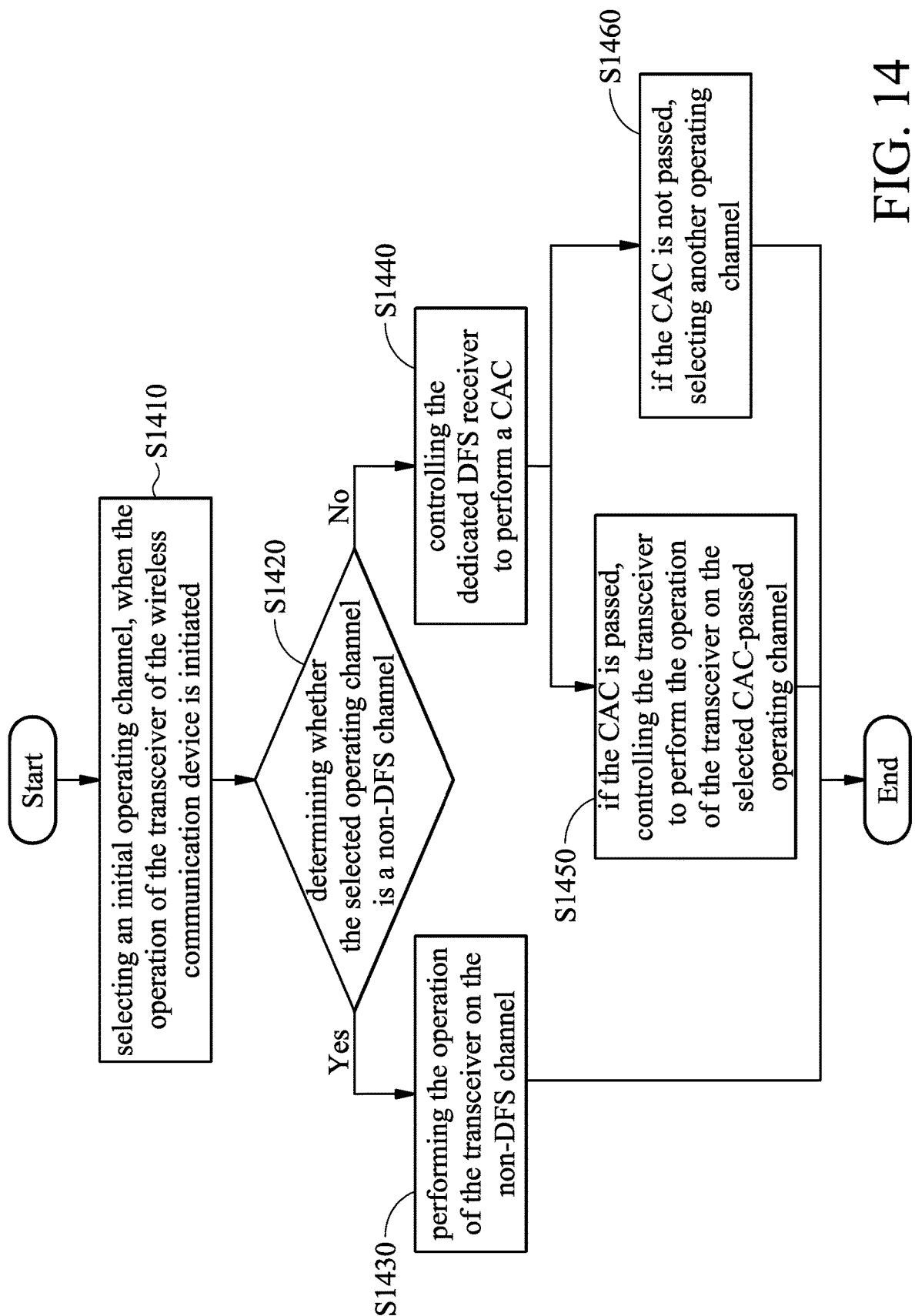
FIG. 14 is a flow chart illustrating the wireless communication method according to another embodiment of the invention.

FIG. 14 is a flow chart illustrating the wireless communication method according to another embodiment of the invention. The wireless communication method may be applied to the wireless communication devices of the invention. As shown in FIG. 14, in step S1410, when the operation of a transceiver of a wireless communication device is initiated, a controller of the wireless communication device may select an initial operating channel. In step S1420, the controller determines whether the selected operating channel is a non-DFS channel. If the selected operating channel is non-DFS channel, step S1430 is performed. In step S1430, the transceiver may perform its operation on that non-DFS channel. If the selected operating channel is a DFS channel, step S1440 is performed. In step 1440, the controller may control the DFS receiver to perform a channel availability check (CAC). If the CAC is passed, step S1450 is performed. In step S1450, the controller controls the transceiver to perform its operation on the selected CAC-passed operating channel. If the CAC is not passed, step S1460 is performed. In step S1460, the controller may select another operating channel and repeat the DFS steps described above. Furthermore, in the wireless communication method, during the transceiver performs its operation on the selected operation channel, the controller controls the DFS receiver to scan for the radar signals in other DFS channels besides the selected operating channels used by the transceiver. When a radar signal is detected in the selected operating channel of the transceiver, the controller may immediately switch the transceiver to another available radar-free DFS channel which is determined through the DFS receiver in advance. If there are more than one radar-free (CAC-passed) channels determined by the DFS receiver, the controller may further consider some factors, such as channel quality, when determining the next operation channel. For example, if there are more than one radar-free (CAC-passed) channels determined by the DFS receiver, the controller may choose a channel having best channel quality or a channel having a channel quality above a threshold as the next operation channel.

Figure 15:
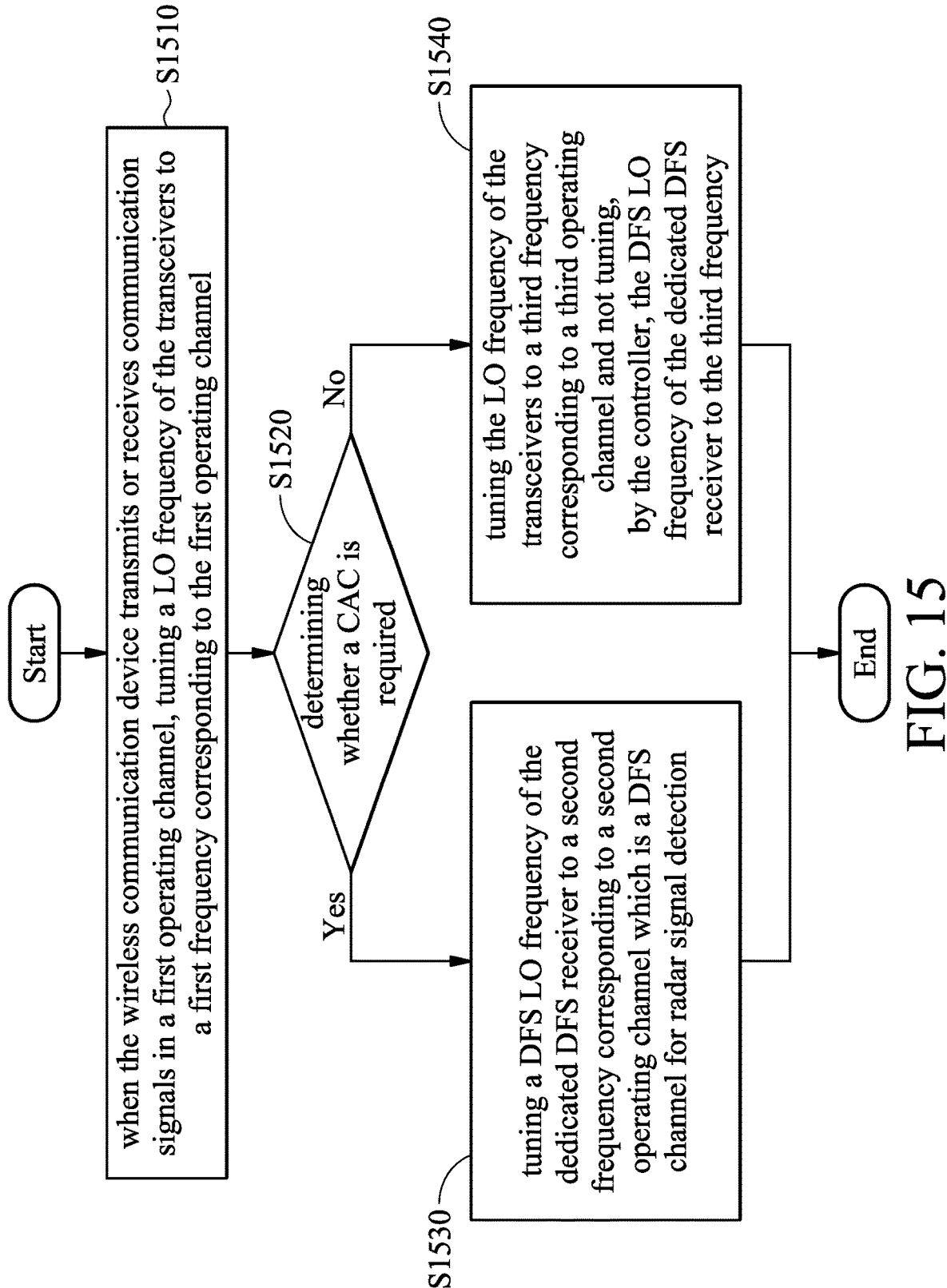
FIG. 15 is a flow chart illustrating the wireless communication method according to another embodiment of the invention.

FIG. 15 is a flow chart illustrating the wireless communication method according to another embodiment of the invention. The wireless communication method may be applied to the wireless communication devices of the invention. As shown in FIG. 15, in step 1510, when the wireless communication device transmits or receives communication signals (e.g., Wi-Fi signals) in a first operating channel, a controller of the wireless communication device tunes the LO frequency of the transceivers to a first frequency corresponding to the first operating channel. In step 1520, the controller may determine whether the CAC is required. When CAC is required (for example, the wireless communication device performs CAC in advance during normal operation, or when interference occurs and the wireless communication device determines to switch from the first operating channel to a second operating channel which is a DFS channel), step S1530 is performed, the controller tunes the DFS LO frequency of the DFS receiver to a second frequency corresponding to the second operating channel which is a DFS channel for radar signal detection. When CAC is not required (for example, when the wireless communication device determines to switch from the first operating channel to a third operating channel which is not a DFS channel), step S1540 is performed. In step S1540, the controller tunes the LO frequency of the transceivers to a third frequency corresponding to the third operating channel and do not tune the DFS LO frequency of the DFS receiver to the frequency corresponding to the third operating channel. The DFS LO frequency of the DFS receiver may be at the second operating channel which is a DFS channel while the transceivers are at the third operating channel.

In the wireless communication devices and methods of the invention, a dedicated DFS receiver may be configured in the wireless communication device. The dedicated DFS receiver can be utilized to scan for radar signals in different DFS channels other than the operating channel which is used by a main receiver. Accordingly, if a radar signal is detected in the operating channel, the wireless communication device can immediately be switched to another available radar-free DFS channel which has been determined by the dedicated DFS receiver in advance. Therefore, the wireless communication device can achieve a high data throughput and minimize the impact on user experience when operating in a DFS channel.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication device with dynamic frequency selection (DFS) capability, comprising:
   at least one transceiver, configured to perform data transmission or data reception on an operating channel;
   a dedicated DFS receiver, integrated in a chip with the transceiver, and configured to scan for radar signals in a plurality of DFS channels; and
   a controller, coupled to the transceiver and the dedicated DFS receiver.

2. The wireless communication device of claim 1, wherein the dedicated DFS receiver has a dedicated RF port and the dedicated DFS receiver and the transceiver are coupled to different antennas.

3. The wireless communication device of claim 1, wherein the dedicated DFS receiver has a dedicated RF port and the dedicated DFS receiver and one of the transceivers s share the same antenna.

4. The wireless communication device of claim 3, further comprising:
   a matching network, coupled to the dedicated DFS receiver and the transceiver which uses the same antenna as the dedicated DFS receiver, wherein the matching network is configured outside of the chip.

5. The wireless communication device of claim 3, further comprising:
   a first switch;
   a second switch; and
   a matching network, configured in the chip,
   wherein when the first switch is closed and the second switch is opened, the dedicated DFS receiver uses its dedicated RF port,
   wherein when the first switch is opened and the second switch is closed, the matching network is coupled to the dedicated DFS receiver and the transceiver, and the dedicated DFS receiver and the transceiver share the same RF port.

6. The wireless communication device of claim 1, wherein the dedicated DFS receiver and one of the transceivers share the same RF port and the same antenna.

7. The wireless communication device of claim 6, further comprising:
   a matching network, directly coupled to the dedicated DFS receiver and the transceiver which uses the same RF port and antenna as the dedicated DFS receiver, wherein the matching network is configured in the chip.

8. The wireless communication device of claim 7, wherein the matching network is directly coupled to a first low noise amplifier (LNA) of the dedicated DFS receiver and a second LNA of the transceiver.

9. The wireless communication device of claim 6, wherein the dedicated DFS receiver further uses the same LNA as the transceiver, wherein the LNA is coupled to the RF port shared by the dedicated DFS receiver and the transceiver.

10. The wireless communication device of claim 9, further comprising:
    a buffer, coupled to the LNA, dedicated DFS receiver and the transceiver.

11. The wireless communication device of claim 1, wherein each transceiver is integrated with a transmitter to be a transceiver.

12. The wireless communication device of claim 11, wherein the transceiver has an RF port to receive and transmit data.

13. The wireless communication device of claim 11, wherein the transceiver is coupled to an external circuit which is configured outside of the chip, and the transceiver has a TX RF port to transmit data and an RX RF port to receive data.

14. The wireless communication device of claim 13, wherein the external circuit comprises one or a combination of an external low noise amplifier (eLNA), external power amplifier (ePA), external transmission/reception switch (eTRSW), or a front-end module (FEM).

15. The wireless communication device of claim 1, comprising:
   a low-band filter, configured outside of the chip; and
   a high-band filter, configured outside of the chip,
   wherein a band comprising the operation band and the plurality of DFS bands is split into a low-band and a high-band by the low-band filter and the high-band filter, and
   wherein a first part of the transceivers corresponds to the low-band and a second part of the transceivers corresponds to the high-band.

16. The wireless communication device of claim 15, wherein the low-band filter and the high-band filter are coupled to different antennas.

17. The wireless communication device of claim 15, wherein the low-band filter and the high-band filter are coupled to the same antennas.

18. The wireless communication device of claim 17, further comprising:
   a second dedicated DFS receiver;
   a first matching network, coupled to the low-band filter and the first part of the transceivers; and
   a second matching network, coupled to the high-band filter and the second part of the transceivers,
   wherein the dedicated DFS receiver and the first part of the transceivers share the same RF port and the second dedicated DFS receiver and the second part of the transceivers share the same RF port.

19. The wireless communication device of claim 1, wherein the controller disables the dedicated DFS receiver when the data transmission is performed on the transceiver.

20. A wireless communication method, applied to a wireless communication device, comprising:
   performing, by at least one transceiver of the wireless communication device, data transmission or reception on an operating channel; and
   scanning, by a dedicated DFS receiver of the wireless communication device, for radar signals in a plurality of DFS channels, wherein the dedicated DFS receiver is integrated in a chip with the transceiver.

21. The wireless communication method of claim 20, further comprising:
   selecting, by a controller of the wireless communication device, an initial operating channel, when the operation of the transceiver of the wireless communication device is initiated;
   if the selected operating channel is a non-DFS channel, performing, by the transceiver, transmission or reception on the non-DFS channel;
   if the selected operating channel is a DFS channel, controlling, by the controller, the dedicated DFS receiver to perform a channel availability check (CAC); and
   if the CAC is passed, controlling, by the controller, the transceiver to perform transmission or reception on the selected CAC-passed operating channel; and
   if the CAC is not passed, selecting, by the controller, another operating channel.

22. The wireless communication method of claim 20, further comprising:
   when the wireless communication device transmits or receives communication signals in a first operating channel, tuning, by a controller of the wireless communication device, a local oscillator (LO) frequency of the transceiver to a first frequency corresponding to the first operating channel;
   determining, by the controller, whether a CAC is required;
   if the CAC is required, tuning, by the controller, a DFS LO frequency of the dedicated DFS receiver to a second frequency corresponding to a second operating channel which is a DFS channel for radar signal detection; and
   if CAC is not required, tuning, by the controller, the LO frequency of the transceiver to a third frequency corresponding to a third operating channel and not tuning, by the controller, the DFS LO frequency of the dedicated DFS receiver to the third frequency.

23. The wireless communication method of claim 20, further comprising:
   controlling, by a controller of the wireless communication device, whether to disable the dedicated DFS receiver.

* * * * *